Aug. 21, 1923.
C. R. HENDERSON
SCREEN ATTACHMENT FOR AUTOMOBILES
Filed Aug. 29, 1922
1,465,821
2 Sheets-Sheet 1
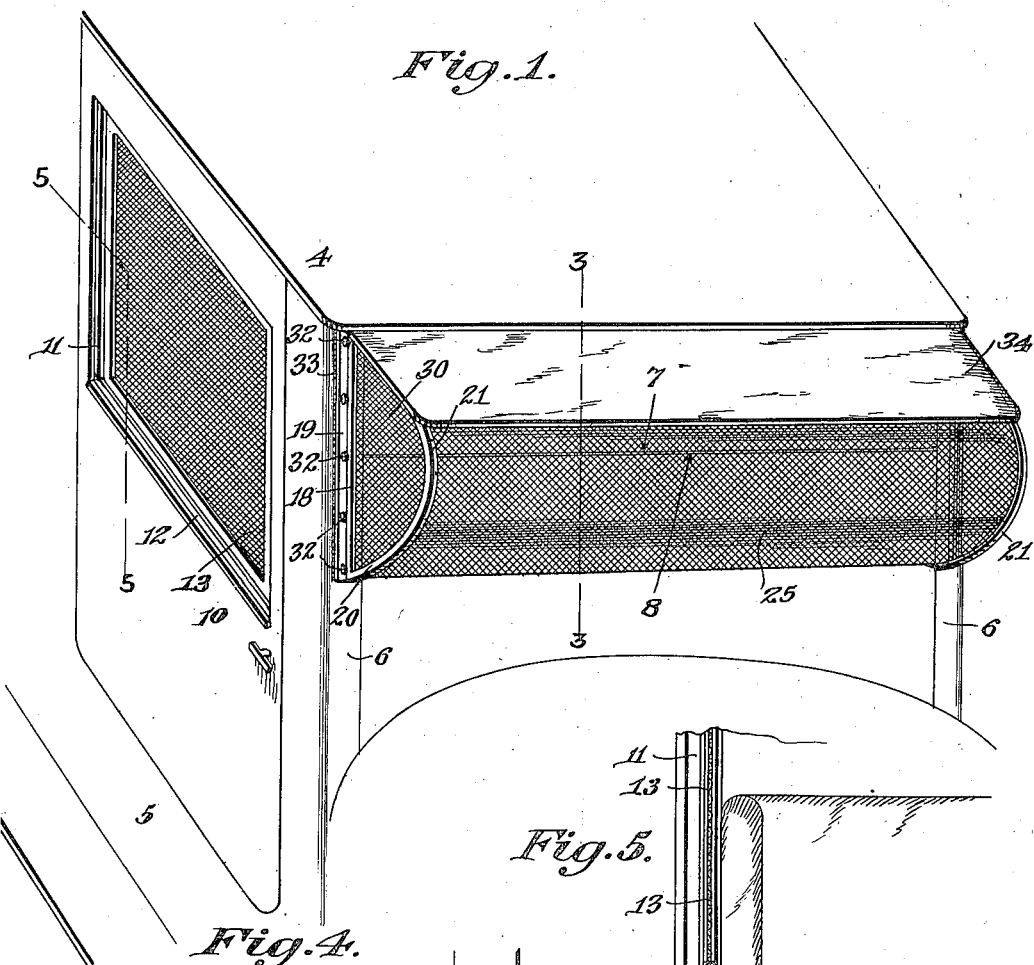
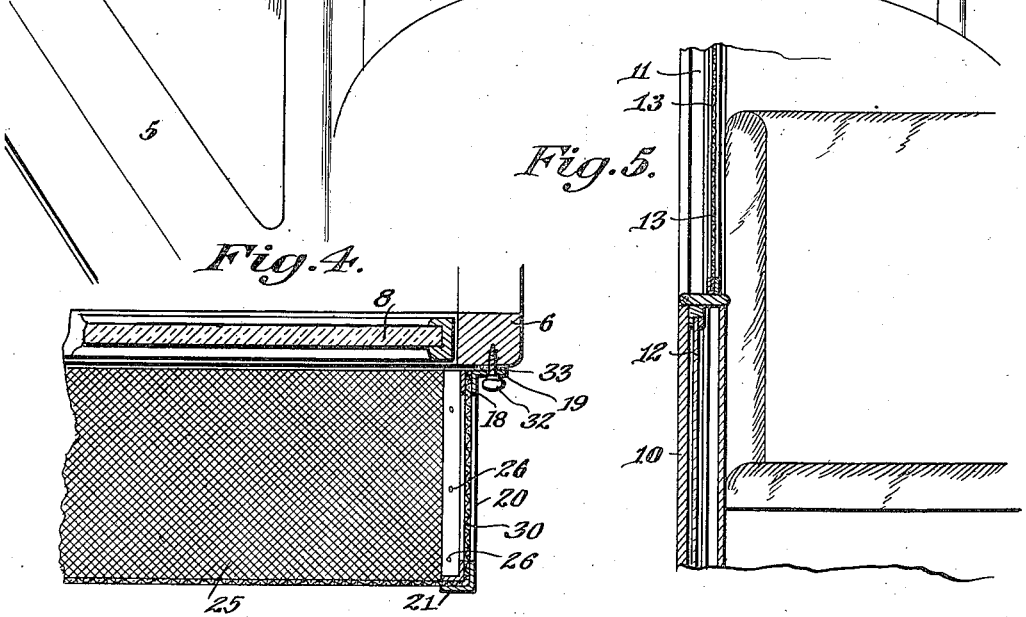
Charles R. Henderson, INVENTOR.
BY Geo. P. Kimmel ATTORNEY.

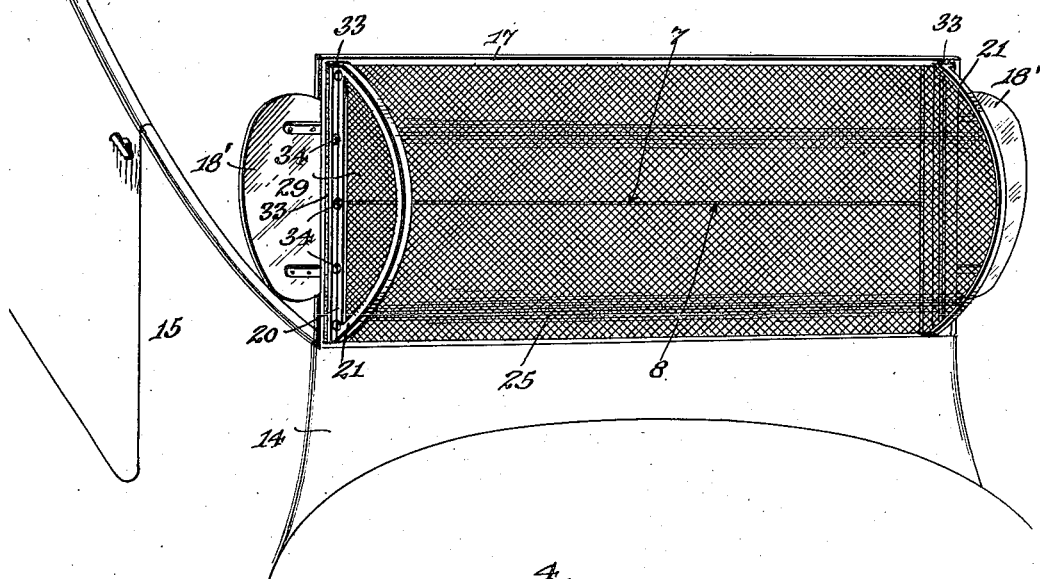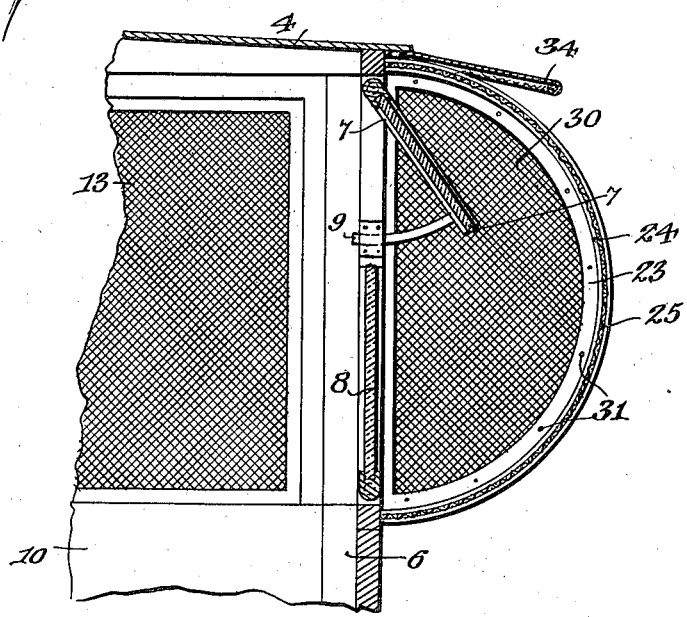

Patented Aug. 21, 1923.

1,465,821

UNITED STATES PATENT OFFICE.

CHARLES R. HENDERSON, OF WATERLOO, ILLINOIS.

SCREEN ATTACHMENT FOR AUTOMOBILES.

Application filed August 29, 1922. Serial No. 584,979.

*To all whom it may concern:*

Be it known that I, CHARLES R. HENDERSON, a citizen of the United States, residing at Waterloo, in the county of Monroe and State of Illinois, have invented certain new and useful Improvements in Screen Attachments for Automobiles, of which the following is a specification.

This invention relates to screen attachments for motor vehicles, and has for its object to provide, in a manner as hereinafter set forth, an attachment of such class adapted to be secured to the top of the vehicle, directly forwardly of and without interfering with the operation of the windshield for overcoming the inconvenience caused by the passage of dust, insects, or other foreign bodies or substances from the exterior to the interior of the vehicle, or on or against the body or bodies or to the eyes of the occupant or occupants of the front seat or against the driver of the vehicle, and further said screen providing means whereby the driving is made possible without the employment of goggles or the like.

Further objects of the invention are to provide a screen attachment for the purpose set forth which is simple in construction and arrangement, strong, durable, not marring the appearance of the vehicle, readily attached to the front of the vehicle forwardly of the windshield, thoroughly efficient in its use, and comparatively inexpensive.

With the foregoing and other objects in view the invention consists in the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a motor vehicle, of the closed type, showing the adaptation therewith of a screen attachment in accordance with this invention.

Fig. 2 is a front elevation of a motor vehicle, of the open type, showing the adaptation therewith of a screen attachment in accordance with this invention.

Fig. 3 is a section on the line 3—3 of Fig. 1, with the upper section of the windshield adjusted.

Fig. 4 is a fragmentary section, in plan, of one end of the screen attachment.

Fig. 5 is a section on the line 5—5 of Fig. 1.

Referring to Fig. 1 of the drawings, which illustrates a type of closed motor vehicle, 4 denotes the top of the vehicle, which projects forwardly from the front 6, and 5 denotes the sides of the vehicle body. The front 6 of the vehicle body is provided with a windshield formed of an adjustable section 7 and a lower section 8, and means for adjusting the upper section 7, as at 9. The sides 5 of the vehicle body are provided with doors 10, having openings 11, for windows 12, and which when these latter are lowered, there is positioned in the openings 11, a removable screen 13. The screens 13 are employed to prevent the passage of dust or insects from the exterior to the interior of the vehicle body. The foregoing elements can be set up in any suitable manner, and are merely illustrated by way of example, whereas to show the adaptation of a screen attachment in accordance with this invention, with respect to a motor vehicle of the closed type.

Referring to Fig. 2 which illustrates the body of a motor vehicle, of the open type, 14 denotes the front of the vehicle body, 15 the sides, 17 the windshield frame which is secured to the front 14 of the vehicle body, and 18' the side mirrors which project laterally from the windshield frame 17. The foregoing elements of structure may be of any suitable construction, but are shown merely by way of example, so that the position of a screen attachment, in accordance with this invention, can be illustrated with respect to the frame of the windshield.

The screen attachment, shown in Figs. 1 and 2, is identical in construction, the difference being that the attachment illustrated in Fig. 1, is secured to the front 6 of the vehicle, whereas the attachment shown in Fig. 2, is secured to the frame of the windshield.

A screen attachment in accordance with this invention comprises a pair of outer supporting frames and a pair of inner supporting frames and the said outer frames associated with said inner frames for securing a series of foraminous elements in position.

The outer supporting frames are oppositely disposed with respect to each other, and the inner supporting frames are arranged in a similar manner. Each of the outer supporting frames consists of a vertically disposed bar 18, provided throughout with an outwardly extending flange 19, which opposes the front 6 of the vehicle body. Each of the outer supporting frames further include an arcuate shaped bar 20, which has its termini formed integral with the termini of the bar 18. The bar 20 is provided throughout with an inwardly extending flange 21, disposed at right angles with respect to the bar. The bars 18 and 20 are flat. The bar 23 is formed throughout with an inwardly extending flange 24, which is disposed at right angles with respect to the bar. The flanges 21 of the bars 20 are arranged at the outer edges of the said bars 20, and the flanges 24 of the bars 23 are arranged at the outer edges of the said bars 23. The flanges 21 overlap and oppose the flanges 24. The flanges 21 are of a greater width than the flanges 24 and secured between the flanges 21 and 24, is a foraminous element 25. Hold-fast devices 26 are employed for securing the element 25 to and between the flanges 21 and 24.

The bars 20 of the outer supporting frames oppose the bars 23 of the inner supporting frames, and arranged between the opposed bars are foraminous elements, one of which at one end of the attachment is indicated at 29, and the other of which, at the other end of the attachment, is indicated at 30. The elements 29 and 30 do not extend beyond the bars 18, and the said elements 29 and 30 are secured between the bars 20 and 23 by suitable hold-fast devices 31.

The bars 20 of the outer supporting frames and the bars 23 of the inner supporting frames project forwardly from the vertical bars of said frame and owing to the contour of the bars 20 and 23, the foraminous element 25 is positioned in a semi-circular manner. The element 25 is of a length equal or slightly greater than the length of either of the sections of the windshield, and owing to the length of the same, and in connection with the elements 29 and 30, the front of the windshield is completely closed by the screen attachment, under such conditions preventing the passage of dirt, dust or insects, or other foreign substances or bodies, from the exterior of the body portion of the car through the windshield opening, to the interior of the car.

In Fig. 1 of the drawings, the flanges 19 of the bars 18 are secured to the front 6 of the vehicle body, by suitable securing devices, as indicated at 32, washers 33 may be exposed between the flanges 19 and the front 6 of the body of the vehicle.

In Fig. 2 of the drawings, the flanges 19 of the bars 18, are secured to the frame 17 of the windshield by suitable securing devices 34.

The inner and outer supporting frames are of a size, that when the screen attachment is secured in position with respect to the windshield, there is no interference set up in any manner which would in any way prevent the adjusting of the windshield. Further the attachment being substantially semi-circular in contour, does not in any manner mar the front appearance of the vehicle body, and furthermore it provides means to prevent the inconvenience caused by dust, dirt or insects from the exterior of the vehicle body coming in contact with the driver, or other occupants of the car, and further prevents insects from entering the car, when the latter is standing still.

In Figs. 1 and 4 of the drawings, the attachment is shown as including a vizor 34, which is secured to the front 6, of the vehicle body, in close proximity to and below the forward end of the vehicle top 4. The vizor 34 depends downwardly at a slight inclination and extends to a point inwardly with respect to the forward end of the attachment. The vizor 34 not only protects the top of the foraminous element 25, but also protects the occupants of the forward seat of the vehicle, more particularly the eyes of said occupants.

What I claim is:—

1. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, and means for securing the forwardly projecting portions of the inner frames to the forwardly projecting portions of the outer frames whereby said foraminous elements are secured in position.

2. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, and means for securing the forwardly projecting portions of the inner frames to the forwardly projecting portions of the outer frames whereby said foraminous elements are secured in position, the said forwardly projecting portions of each of said frames being angle shaped in cross section and semi-circular in contour.

3. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, and means for securing the forwardly projecting portions of the inner frames to the forwardly projecting portions of the outer frames whereby said foraminous elements are secured in position, the vertically extending inner portion of each of said outer frames provided with a laterally extending flange formed with openings for the passage of hold-fast devices.

4. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, means for securing the forwardly projecting portions of the inner frames to the forwardly projecting portions of the outer frames whereby said foraminous elements are secured in position, and a visor projecting forwardly from the inner portions of the outer frames and extending over the upper portion of the first mentioned foraminous element.

5. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, means for securing the forwardly projecting portions of the inner frames to the forwardly projecting portions of the outer frames whereby said foraminous elements are secured in position and a visor projecting forwardly from the inner portions of the outer frames and extending over the upper portion of the first mentioned foraminous element, said visor extending at an inclination.

6. A screen attachment for motor vehicles comprising a pair of spaced outer frames adapted to be secured to the vehicle and each including an inner vertical portion and a forwardly projecting portion, a pair of spaced inner supporting frames each including an inner vertical portion and a forwardly projecting portion, the forwardly projecting portions of the outer frames overlapping and spaced from the forwardly projecting portions of the inner frames, a foraminous element having its ends mounted on the forwardly projecting portions of said inner frames, foraminous elements interposed between said inner and outer frames, and means for securing the forwardly projecting portions of the inner frames to the forwardly projecting portions of the outer frames whereby said foraminous elements are secured in position, the said forwardly projecting portions of each of said frames being angle shaped in cross section and semi-circular in contour, and a visor projecting forwardly from the inner portion of said outer frame and extending over the upper portion of the first mentioned foraminous element.

7. A screen attachment for motor vehicles comprising two pair of forwardly projecting semi-circular frames, one pair spaced from the other, each pair comprising an inner and an outer frame, the outer frame of each pair overlapping the inner frame, a foraminous element arranged between each pair of frames, means for securing each pair of frames together thereby maintaining said elements in position, a semi-circular foraminous element having each of its ends secured between and to a pair of frames, and a stationary visor extended over the upper portion of the last mentioned foraminous element.

8. A screen attachment for the purpose set forth comprising a pair of semi-circular inner frames spaced from each other and each angle shaped in cross section, a semi-circular outer frame arranged in close proximity to each of the inner frames and angle shaped in cross section, each of said outer frames provided with an outwardly projecting vertical flange provided with openings for the passage of hold-fast devices for fixedly securing said outer frames in position, a semi-circular foraminous element positioned between an inner frame and its associated outer frame, a foraminous element conforming in contour to the shape of said frame and having its ends positioned against said inner frame, and means for securing the inner to the outer frames thereby maintaining said foraminous elements in position.

In testimony whereof, I affix my signature hereto.

CHARLES R. HENDERSON.